HERNIA BELT

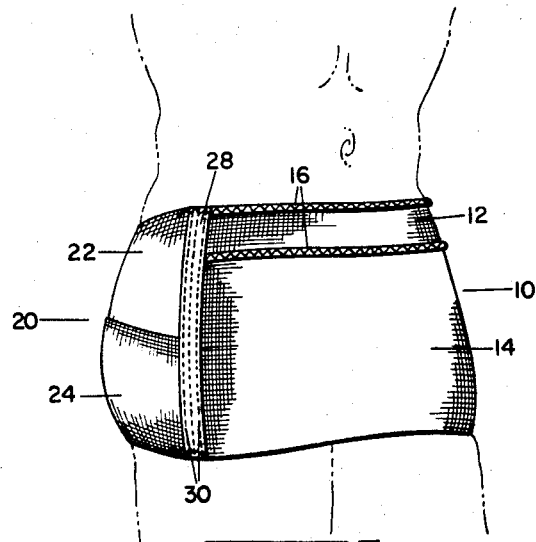
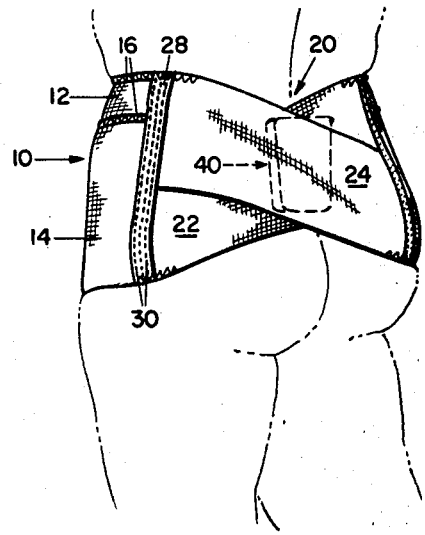
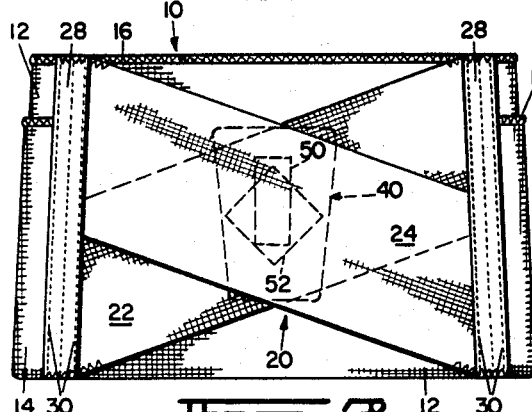
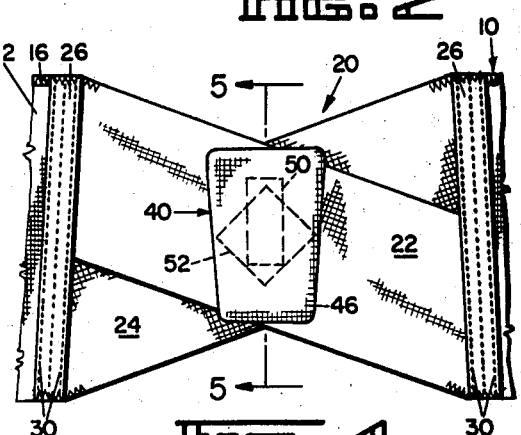
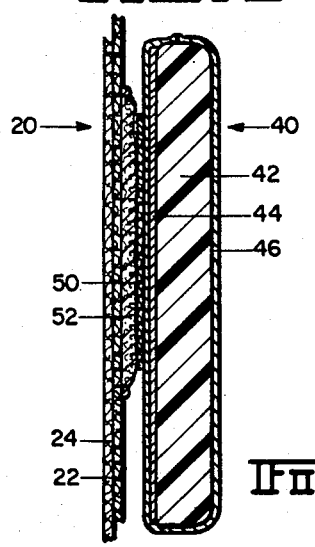
INVENTORS.
AMELIA TRZNADEL
THADDEUS J. TRZNADEL July 23, 1968  A. TRZNADEL ET AL  3,393,675

Filed Jan. 4, 1966  3 Sheets-Sheet 2

INVENTORS.
AMELIA TRZNADEL
THADDEUS J. TRZNADEL
BY Kenwood Ross
ATTORNEY.

July 23, 1968 A. TRZNADEL ET AL 3,393,675
HERNIA BELT
Filed Jan. 4, 1966 3 Sheets-Sheet 3

INVENTORS.
AMELIA TRZNADEL
THADDEUS J. TRZNADEL
BY *Kenwood Ross*
ATTORNEY.

3,393,675
HERNIA BELT
Amelia Trznadel and Thaddeus J. Trznadel, both of
277 Suffolk St., Holyoke, Mass. 01040
Filed Jan. 4, 1966, Ser. No. 518,636
1 Claim. (Cl. 128—101)

ABSTRACT OF THE DISCLOSURE

An articulatable supporting device consisting of an elasticized body-engirdling belt having associated therewith a pad releasably and adjustably affixed thereto in any selected bearing position against a part of the anatomy of the wearer.

The invention relates to body-supporting garments and more particularly to such garments employable as hernia belts and as sacroiliac-back supports and teaches an elasticized body engirdling belt having incorporated therewith at least one semi-resilient pad releasably and adjustably affixed thereto and so as to be multi-positioned for bearing against selected portions of the human anatomy to give desired support thereto.

In the drawings:

FIG. 1 is a view in front perspective of one form of belt embodying the invention being worn as a sacroiliac-back support for a human body;

FIG. 2 is a view in rear perspective of the form of belt shown in FIG. 1 being worn as a sacroiliac-back support for a human body;

FIG. 3 is a view in rear elevation of the form of belt shown in FIG. 1;

FIG. 4 is a view in front elevation of the form of belt shown in FIG. 3 with the front panel thereof being broken away for purposes of clarity;

FIG. 5 is an enlarged fragmentary view in section taken on line 5—5 of FIG. 4;

Figure 6:
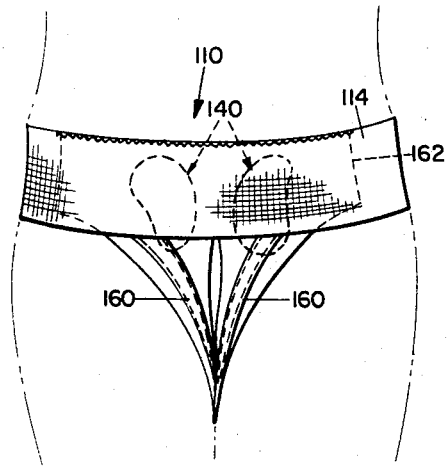
FIG. 6 is a view in front perspective of another form of belt embodying the invention being worn as a double-hernia support for a human body.

We have shown, in FIGS. 1–5, a belt, embodying one form of the invention, which is disposed in a tightly-engirdling manner about a portion of the human anatomy and is worn in the manner of a sacroiliac-back support for purposes of achieving an application of pressure to the back of the body so as adequately to support the base of the spine or sacroiliac.

Said belt is fabricated from a suitable elastic material having the desired characteristics of strength, resiliency and elasticity so as to allow attainment of a maximum degree of supporting pressure with a minimum of discomfort to the user.

In structure, said belt comprises a front panel, generally indicated by 10, formed from a generally rectangular length of a suitable elasticized material which has been doubled over along a transversely extending fold line to provide a pair of inner and outer superposed panels 12 and 14 respectively of suitable width, thereby to provide necessary support in the area of the abdomen and/or buttocks, and of suitable length so as partially to engirdle these body portions.

Edging 16 may be applied to the upper edges of panels 12 and 14 to insure against unraveling and to provide smooth edges for adding wearing comfort.

A rear panel, generally indicated by 20, comprises a pair of rectangular strips 22 and 24 of a suitable elasticized material criss crossed as to each other in the manner of an X and each joined at opposite ends to the respective ends of panel 10 adjacent the upper and lower edges of the latter by means of inner and outer binding strips 26 and 28 respectively and rows of stitching 30 extending through the front and rear panels and the superposed binding strips.

The resulting structure constitutes an elasticized endless belt adapted to accommodate itself in an engirdling manner to a wide variety of body shapes and sizes while yet insuring adequate support and comfort to any wearer. The belt may also be provided in various sizes, if desired.

Means is provided for releasably and adjustably affixing a semi-resilient pad to the inwardly-facing surface of rear panel 20 of the belt for the purpose of applying additional pressure to the base of the spine, same being requisite in the case of sufferers of back-sprain or other back injuries.

The pad being releasably affixable to the belt, it offers the advantage that it may be readily removed for purposes of laundering or repair of the pad or belt and/or for the employment of a pad of greater or lesser resiliency and/or for the relocation of the pad to another situs with respect to the wearer.

The pad, generally indicated by 40, preferably includes a semi-resilient core 42 of rubber or plastic or similar material fixed to a rigid backing member 44, with the whole being encased in a wrapper 46 of a soft fabric material and preferentially, although not obligatorily, presenting a somewhat keystone shape in plan so as to be more easily accommodated at that area of the body where it will be normallly disposed. Contrariwise, the pad may be oval-shaped for sacroiliac purposes.

The means for releasably and adjustably affixing pad 40 to the belt is preferably in the form of an outwardly-facing strip of "Velcro" 50 of a type such as disclosed in the United States Patent to De Mestral #2,717,437, issued on Sept. 13, 1955, the strip being stationarily affixed to the pad as by stitching or alhesive or other suitable means at the planar face of the pad which is backed by backing member 44.

Strip 50 is releasably engageable with a patch 52 of flannel or other fabric having a raised pile, the patch being affixed to the inner rectangular strip 22 of rear panel 20 as by stitching or adhesive or other suitable means so as to face inwardly toward the body as the belt is being worn.

Patch 52 is preferably located centrally of rear panel 20 and at the crossing point of rectangular strips 22 and 24, although it need not necessarily be so located. It is affixed to the rear panel in such manner that its side edges are disposed in oblique relation to the major axes of strips 22, 24 of the rear panel. Strip 50 is preferably positioned along the vertical axis of pad 40 wherefor the pad may be selectively located either on the right or the left side of the rear panel and may be moved up or down or inclined or rotated relative to the panel, all whereby the pad may be positioned in a given application as to achieve an application of pressure at that precise region adjacent the base of the spine where it is most needed.

As the belt is worn, rear panel 20 is disposed at the rear of the body and pad 40 supported thereby is so positioned that the pad bears directly upon the base of the spine at the desired location, with the soft fabric wrapper of the pad contacting the skin of the wearer to mitigate against chafing and other discomforts.

Of course, it is to be understood that the belt may be worn without the cooperant pad, if the additional support afforded thereby is not needed at a particular time or for a particular individual.

In FIGS. 6–10, we have shown another form of belt designed primarily to be worn in the manner of a hernia belt so as to apply pressure to the front of the body in support of a hernia at one or both sides of the body.

In structure, such belt envisions a body-engirdling strap, generally indicated by 110, formed from a pair of superposed and generally-coextensive elongated body-engirdling lengths of fabric formed from a suitable elasticized material, to provide inner and outer superposed panels 112 and 114 respectively, which lengths are joined at their adjacent ends as by binding or stitching.

Means is provided for releasably and adjustably interengaging the opposite ends of strap 110 together in the form of a "Velcro" strip 150 suitably secured to one end of the inner face of inner panel 112 so as to be disposed adjacent the other end of the outer face of outer panel 114 and to be facing toward the body as the belt is worn.

Strip 150 is releasably engageable with one of a pair of patches 152 of flannel or other fabric having a raised pile, the patches 152 being disposed at the opposite end of strap 110 from strip 150 and suitably secured to outer panel 114 so as to be facing away from the body as the belt is worn. A greater or lesser number of patches 152 may be provided, if desired.

When strap 110 is enwrapped about the waist of a user, strip 150 is brought into face-to-face confrontation with one of the patches 152 to assure a positive and perfect fastening.

There being a plurality of such patches 152, the strap is readily adjustable to meet varying size requirements or physical conditions.

Means in the form of a pair of leg encircling straps 160, 160 are provided for aid in anchoring the body strap in situ and thereby to obviate any objectionable upward creep.

The leg encircling straps are forned integrally with and depend from each end of a fabric panel 162 suitably secured to the inwardly-facing face of inner panel 112, with such fabric panel being disposed at the front of the body as the belt is worn.

An elastic strap 164 is secured at one of its ends to the outer free end of each leg encircling strap, each such elastic strap having a patch 166 of flannel or other fabric fixed to one of its faces at its opposite end, said patch being releasably and adjustably engageable with a Velcro strip 168 fixed to the outwardly-facing face of inner panel 112 when the elastic strap is passed between the inner anl outer panels of the body strap.

The end of the strap may be repositioned relative to Velcro strip 168 at will, it being possible to move the strap horizontally or vertically while still allowing engagement of patch 166 with the Velcro strip.

Figure 7:
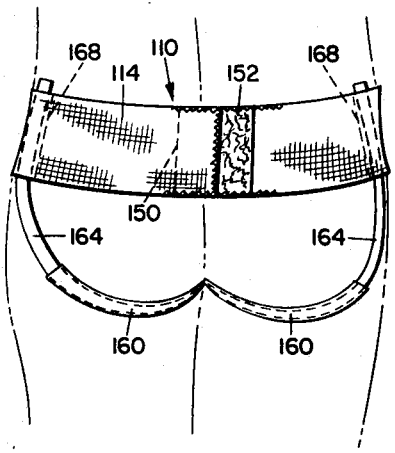
FIG. 7 is a view in rear perspective of the form of belt shown in FIG. 6 being worn as a double-herna support for a human body.
Figure 8:
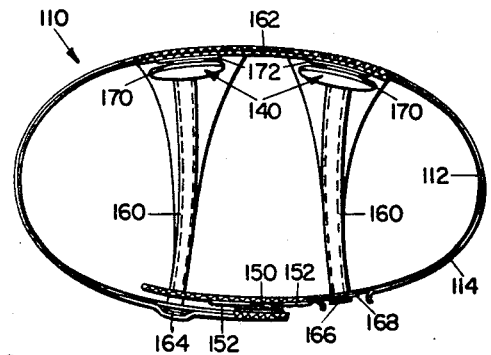
FIG. 8 is a view in top plan of the form of belt shown in FIGS. 6 and 7.
Figure 9:
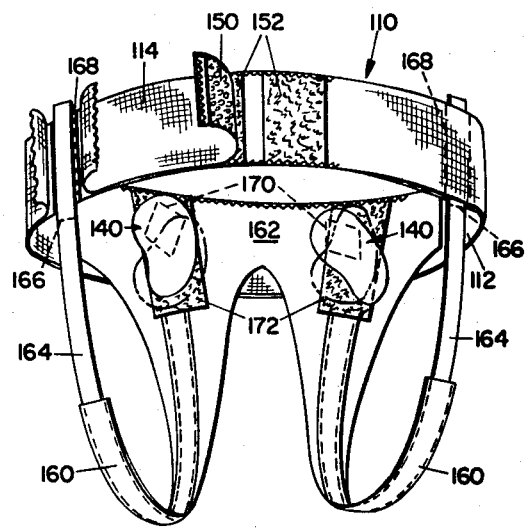
FIG. 9 is a view in rear perspective of the form of belt of FIGS. 6–8 with parts thereof being broken away for purposes of clarity.
Figure 10:
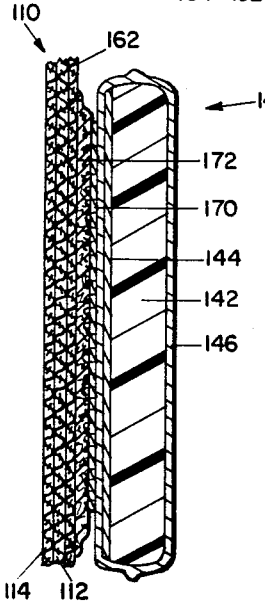
FIG. 10 is an enlarged fragmentary view in cross section through one of the pads and belt of the form shown in FIGS. 6–9.
Figure 11:
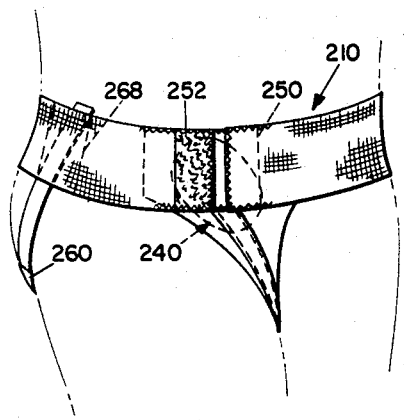
FIG. 11 is a view in front perspective of another form of belt embodying the invention being worn as a right side hernia support for a human body.
Figure 12:
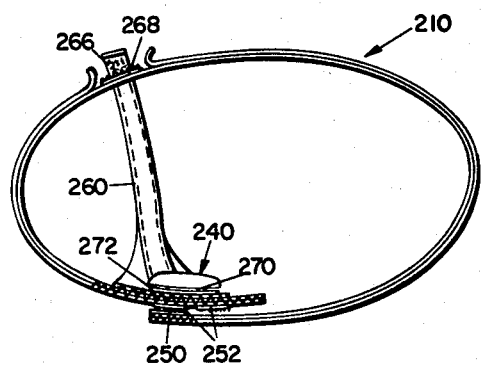
FIG. 12 is a view in top plan of the form of belt shown in FIG. 11.
Figure 13:
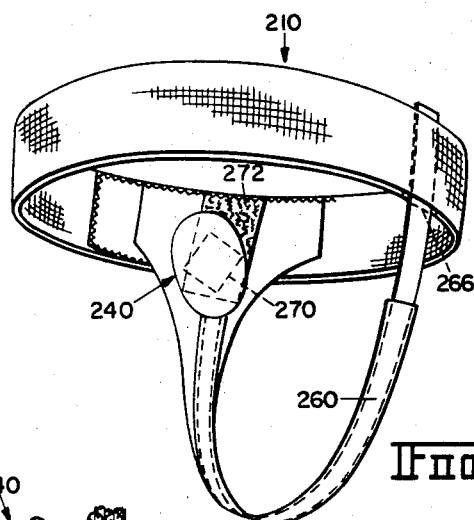
FIG. 13 is a view in rear perspective of the form of belt shown in FIGS. 11–12.
Figure 14:
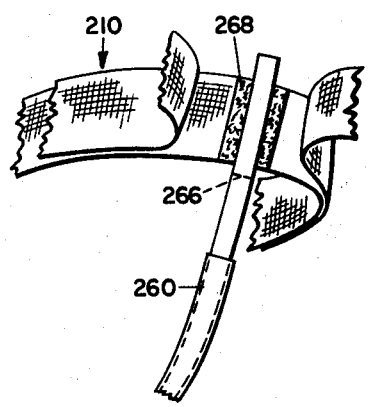
FIG. 14 is a fragmentary view in rear perspective of the form of belt shown in FIGS. 11–13 with parts thereof being broken away for purposes of clarity.
Figure 16:
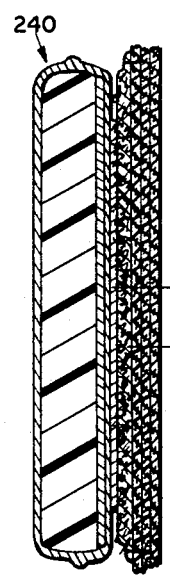
FIG. 16 is an enlarged fragmentary view in cross section through the pad and belt of the form shown in FIGS. 11–15.
Figure 15:
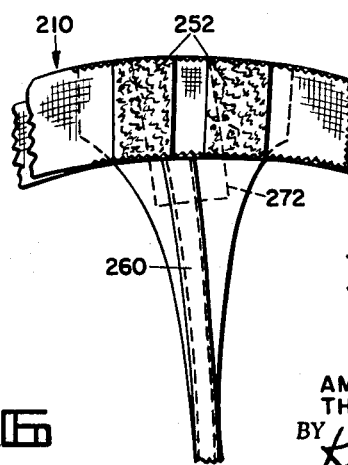
FIG. 15 is a fragmentary view in front perspective of the form of belt shown in FIGS. 11–14 with parts thereof being broken away for purposes of clarity.

As the belt is worn, the leg encircling straps are disposed, as shown in FIG. 7, to pass downwardly from the front of body strap 110 and between the legs of the wearer, around the buttocks and upwardly to the rear of the body strap, there to be releasably and adjustably joined to the body strap by Velcro strips 168.

Since one end of each leg encircling strap is free, each may be selectively positioned and adjusted to insure a maximum in support and wearer comfort, A pair of identical semi-resilient pads, generally indicated by 140, 140, preferably although not necessarily of generally kidney shape in plan, are provided for applying pressure at each side of the groin area of the body for the treatment of a double hernia.

Except for shape, pads 140 are identical to pad 40 of FIGS. 1–5 and each comprise a semi-resilient core 142 fixed to a rigid backing member 144, the whole being encased in a soft fabric wrapper 146.

Each pad 140 carries a Velcro strip 170 which is releasably engageable with an inwardly-facing strip 172 of flannel or fabric fixed to body strap 110 and disposed adjacent each end of fabric panel 162.

Since the pads are releasably and adjustably engageable with the body strap, they may be positioned to provide maximum bearing support upon the hernia. That is, they may be moved upwardly, downwardly, to the right or to the left and they may be rotated relative to the belt.

The belt of FIGS. 11–15 is identical to that of FIGS. 6–10 with the exception that it incorporates only one leg strap and pad and is specifically designed for use with a hernia on one side of the body.

The particular belt shown is designed for use with a right-side hernia. It is obvious that a similar belt for a left-hide hernia can be provided by the simple expedient of placing the leg strap and pad so that they are similarly disposed at the left side of the body as the belt is worn.

The belt of FIGS. 11–16 being virtually identical to that of FIGS. 6–10, a detailed discussion of its structure is unnecessary. Suffice to say that the right-side hernia belt of FIGS. 11–15 comprises a body engirdling strap 210 having a Velcro strip 250 and flannel or fabric patches 252 at its opposite ends, a single leg strap 260 being fixed at one end to the body strap and adapted to be passed around the right leg of the wearer and to be releasably and adjustably affixed at its opposite end to the body strap by a flannel or fabric patch 252 on the leg strap and a Velcro strip 268 on strap 210, and a semi-resilient pad 240 having a Velcro strip 270 affixed thereto and releasably and adjustably engageable with a flannel or fabric strip 272 on the body strap and disposed at the right side of the body, the pad being adapted to press upon a hernia on the right side of the body.

As with the other embodiments, pad 240 may be moved to a plurality of positions to insure maximum support and wearer comfort.

The belts of FIGS. 6–16 may be worn without pads if lower abdominal support only is desired.

We claim:

1. An articulatable supporting device for placement about the body of a wearer and consisting of:
  an elasticized body-engirdling belt worn by the wearer and including a pair of panels with a first panel comprising a pair of crisscrossed overlapped strips each joined at its opposite outer ends to the adjacent outer end of a second panel doubled over along a transversely extending fold line providing inner and outer superposed sections, and a pad releasably and adjustably affixed to the belt in any selected pressure-exerting position against a part of the anatomy of the wearer.

References Cited

UNITED STATES PATENTS

| | | | |
|---|---|---|---|
| 2,310,864 | 2/1943 | Pegg | 128—96 |
| 3,141,457 | 7/1964 | Davidson | 128—95 |
| 3,236,233 | 2/1966 | Thompson | 128—107 |

ADELE M. EAGER, *Primary Examiner.*